(12) United States Patent
Cyr et al.

(10) Patent No.: US 7,828,934 B2
(45) Date of Patent: Nov. 9, 2010

(54) REACTIVE CATIONIC RESINS FOR USE AS DRY AND WET STRENGTH AGENTS IN SULFITE ION-CONTAINING PAPERMAKING SYSTEMS

(75) Inventors: Shane Cyr, Landenberg, PA (US); Henk Bakker, Barneveld (NL); Willem Marinus Stevels, Harderwijk (NL); Ronald Richard Staib, Hockessin, DE (US)

(73) Assignee: Hercules Incorporated, Wilmington, DE (US)

( * ) Notice: Subject to any disclaimer, the term of this patent is extended or adjusted under 35 U.S.C. 154(b) by 467 days.

(21) Appl. No.: 11/304,345

(22) Filed: Dec. 15, 2005

(65) Prior Publication Data

US 2006/0142535 A1    Jun. 29, 2006

Related U.S. Application Data

(60) Provisional application No. 60/637,848, filed on Dec. 21, 2004.

(51) Int. Cl.
*D21H 17/55* (2006.01)
*D21H 21/20* (2006.01)

(52) U.S. Cl. .................. 162/166; 162/164.6; 162/168.3; 162/185

(58) Field of Classification Search .............. 162/164.6, 162/166, 168.3, 185
See application file for complete search history.

(56) References Cited

U.S. PATENT DOCUMENTS

| | | | |
|---|---|---|---|
| 2,963,395 A * | 12/1960 | Back et. al. | 162/83 |
| 3,507,743 A * | 4/1970 | Cartsunis et al. | 162/72 |
| 3,556,932 A | 1/1971 | Coscia et al. | 162/166 |
| 3,556,933 A | 1/1971 | Williams et al. | 162/167 |
| 4,603,176 A | 7/1986 | Bjorkquist et al. | 525/329.4 |
| 4,605,702 A | 8/1986 | Guerro et al. | 525/154 |
| 4,676,263 A | 6/1987 | Mahieu et al. | 132/7 |
| 5,723,022 A | 3/1998 | Dauplaise et al. | 162/168.3 |
| 5,954,538 A | 9/1999 | Huang | 439/502 |
| 6,238,521 B1 | 5/2001 | Shing et al. | 162/164.1 |
| 2002/0134521 A1* | 9/2002 | Shannon et al. | 162/164.4 |
| 2005/0187356 A1* | 8/2005 | Hagiopol et al. | 525/329.4 |

FOREIGN PATENT DOCUMENTS

| | | |
|---|---|---|
| DE | EP0678528 | 10/1995 |
| EP | 0 133 699 | 3/1985 |

OTHER PUBLICATIONS

Roberts, J.C. "Paper Chemistry", 1996, Chemistry of Paper, Cambridge Royal Society of Chemistry, GB, pp. 107-110.
Patent Abstract of Japan vol. 006 No. 040 (C-094), Mar. 12, 1982.
Patent Abstract, JP 56 157403 A (Sumitomo Chem. Co. Ltd), Dec. 4, 1981.
Wet Strength Resins and Their Applications, Chapter 3, Glyoxalated Polyacrylamide Resin, L.L. Chan, ISBN 0-89852-060-6, (1994).
Casey, Pulp and Paper, New York, Interscience Publishers, Inc. (1952).

* cited by examiner

*Primary Examiner*—Eric Hug
*Assistant Examiner*—Dennis Cordray
(74) *Attorney, Agent, or Firm*—Joanna Mary Fobare Rossi; Robert O'Flynn O'Brien (57) ABSTRACT

This invention relates to resins useful for imparting strength to paper, the process of incorporating these resins into paper and the paper produced containing the resins. In particular the invention relates to resins useful for imparting dry-strength and wet-strength to paper under conditions of high sulfite ion concentrations.

7 Claims, 1 Drawing Sheet

FIG. 1

REACTIVE CATIONIC RESINS FOR USE AS DRY AND WET STRENGTH AGENTS IN SULFITE ION-CONTAINING PAPERMAKING SYSTEMS

This application claims the benefit of U.S. Provisional Application Ser. No. 60/637,848 filed on Dec. 21, 2004, the contents of which are hereby incorporated by reference.

FIELD OF THE INVENTION

The present invention relates to glyoxalated copolymers of acrylamide containing significant amounts of cationic comonomer and their use in papermaking operations. These resins, when added as a wet-end paper chemicals, provide wet and dry strength in paper making systems which contain sulfite ion. Also, the resins were found to provide drainage benefits in recycled linerboard.

BACKGROUND OF THE INVENTION

Certain papermaking systems contain paper pulps bleached or brightened using sodium dithionite, also known as sodium hydrosulfite. The resultant bleached or brightened pulps or mechanical fibers are commonly used in the newsprint and publication grade market segment as well as other paper market segments. These pulps or mechanical fibers can contain significant levels of sulfite residuals in the papermaking wet end which presents a challenge to the papermaking process. Other sources of sulfite include shared white water systems and deliberate addition of sulfite to eliminate traces of chlorine. One problem associated with elevated sulfite levels is that synthetic strength resins based upon glyoxalated poly (acrylamide) have limited effectiveness due to the action of sulfite ion on the resin decreases or eliminates its effectiveness.

In commercial practice, glyoxalated poly (acrylate) resins are prepared by reacting glyoxal with a copolymer of acrylamide and a small amount of cationic comonomer, typically diallyldimethylammonium chloride (DADMAC), to obtain mildly cationic resins. Such resins are described in U.S. Pat. Nos. 3,556,933, 4,605,702 and 5,723,022, the disclosures of which are incorporated herein by reference.

It is well known that glyoxalated resins lose their effectiveness to impart strength to paper in sulfite-containing environments. Sulfite ions are reactive towards the gem-hydroxyl functionalities present in these resins This problem is recognized in the papermaking art, and was clearly set forth by C. E. Farley in a TAPPI Monograph on Wet Strength Resins and their Application (L. L. Chan, editor, 1994, ISBN 0-89852-060-6, Chapter 3 "Glyoxalated polyacrylamide resin"). The following quote is believed to represent the generally accepted opinion of the effect of sulfite on glyoxalated polyacrylamide resins:

"The resin reacts with sulfite and bisulfite ions present in the paper machine wet end. The anionic bisulfite adduct which forms can offset a portion or all of the cationic charge on the resin, and efficiency is lost due to reduced resin retention in the paper. The presence of sulfites in the paper machine wet end is due to either bleaching (hydrosulfite) carryover or addition of antichlor. Where sulfite levels are controlled at about 2 ppm or less, glyoxalated PAM efficiency is not affected."

In order to solve the problem of sulfites' deleterious effect on strength resins, oxidants have been added to the paper machine wet end, or highly cationic resins have been added to complex with the now anionic glyoxalated polyacrylamide.

Glyoxalated poly(acrylamide)s and variants thereof have been disclosed in a number of US and other patents.

U.S. Pat. No. 3,556,932 teaches the use of water soluble, ionic glyoxalated vinylamide wet strength resins and paper made therewith. Specifically, U.S. Pat. No. 3,556,932 teaches the use of cationic vinylamide polymers and copolymers of acrylamide and diallyldimethylammonium chloride in 99:1 to 75:25 ratio. U.S. Pat. No. 3,556,933 teaches the use of sulfite ion to enhance the storage stability of the resins of U.S. Pat. No. 3,556,932, and regeneration of such resins using formaldehyde.

U.S. Pat. No. 4,603,176 teaches the use of glyoxalated terpolymers containing a polar non-nucleophilic unit, which does not cause the resin to become water insoluble, as temporary wet strength agent. A cationic fragment is also included in the compositions taught. U.S. Pat. No. 4,605,702 teaches the use of low molecular weight polymers as a basis for temporary wet strength resins. Specifically, U.S. Pat. No. 4,605,702 teaches the use of 1-30 by weight % of a cationic comonomer or mixture of cationic comonomers copolymerizable with acrylamide. U.S. Pat. No. 4,954,538 teaches the use of microparticles consisting of glyoxalated acrylamide containing polymeric material as wet- and dry strength agents for use in paper production. U.S. Pat. No. 5,723,022 teaches compositions of blends of compositions of U.S. Pat. Nos. 3,566,932 and 4,605,702.

The need exists for resins for imparting strength to paper which are relatively resistant to the level of sulfite ions present in the papermaking process.

BRIEF DESCRIPTION OF THE INVENTION

The present invention relates to a reactive cationic resin comprising a copolymer produced from a comonomer which is dialdehyde reactive, a cationic comonomer and a dialdehyde wherein the cationic comonomer is selected from the group consisting of diallyldimethylammonium chloride (DADMAC), 2-vinylpyridine, 4-vinylpyridine, 2-vinyl-N-methylpyridinium chloride, 2-(acryloyloxyethyl)-trimethylammonium chloride, 2-(dimethylamino)ethyl acrylate, 3-acrylamidopropyl-trimethylammonium chloride, dimethylaminopropyl acrylamide, and trimethyl(p-vinylbenzyl)ammonium chloride and wherein the cationic comonomer comprises greater than 10 mole % of the copolymer before reaction with dialdehyde.

DETAILED DESCRIPTION OF THE INVENTION

This invention relates to a resin, its synthesis and its use in wet-strength and/or dry-strength applications. The resins of the present invention are of particular use in papermaking systems were there are elevated amounts of sulfite ions present.

The present invention relates to copolymers of dialdehyde-reactive comonomers, preferably acrylamide, which contain a significant amount of cationic comonomer which has been reacted with a dialdehyde, preferably glyoxal to produce a resin. These resins, in the form of aqueous solutions, are useful in papermaking systems containing sulfite ions.

As defined herein, the term "comonomer" includes materials of higher molecular weights such as oligomers, as well as monomeric materials.

A comonomer which is dialdehyde-reactive of use in the formation of the reactive cationic resins of the invention may be any comonomer which is dialdehyde-reactive which is capable of reacting through radical chain polymerization with a cationic comonomer to form a dialdehyde-reactive copolymer. Preferably, the comonomer which is dialdehyde-reactive selected from the group consisting of acrylamide, methacrylamide, N-methyl acrylamide, and N-methyl methacrylamide. Most preferably, the comonomer which is dialdehyde-reactive is acrylamide or methacrylamide.

A cationic comonomer of use in the formation of the reactive cationic resins of the invention may be any cationic monomer which is capable of reacting through radical chain polymerization with the comonomer which is dialdehyde-reactive to form a dialdehyde-reactive copolymer. Cationic monomers include tertiary and quaternary diallyl amino derivatives, or tertiary and quaternary amino derivatives of acrylic acid or (meth)acrylicacid or acrylamide or (meth)acrylamide, vinylpyridines and quaternary vinylpyridines, or para-styrene derivatives containing tertiary or quaternary aminoderivatives.

The cationic comonomers may be a member selected from the group consisting of diallyldimethylammonium chloride (DADMAC), [2-(acrylamido)ethyl]trimethylammonium chloride, [2-(methacrylamido)ethyl]trimethylammonium chloride, [3-(acrylamido)propyl ]trimethylammonium chloride, [3-(methacrylamido)propyl]trimethylammonium chloride, N-methyl-2-vinylpyridinium N-methyl-4-vinylpyridinium, p-vinylphenyltrimethylammonium chloride, p-vinylbenzyltrimethyammonium chloride, [2-(acryloyloxy)ethyl]trimethylammonium chloride, [2-(methacryloyloxy)ethyl]trimethylammonium chloride, [3-(acryloyloxy)propyl]trimethylammonium chloride, [3-(methacryloyloxy)propyl]trimethylammonium chloride It is understood that mixtures of cationic comonomers can be used to the same purpose. It is preferred that the cationic comonomers are not reactive towards dialdehyde under basic conditions, e.g., greater than pH 7.

A preferred cationic comonomer is diallyidimethylammonium chloride (DADMAC).

The reactive cationic resin may include structures in which dialdehyde units have reacted with comonomer which contain aldehyde functionality to form one or more crosslinks. This reaction is used to increase the molecular weight of the reactive cationic resin.

The reactive cationic resins exhibit charge densities of greater than 1.0 meq/g as determined by the method set forth hereinbelow. Preferably, the reactive cationic resins exhibit charge densities of greater than 1.5 meq/g, more preferably greater than 2.5 meq/g.

These reactive cationic resins are most conveniently made in two steps.

In the first step, the comonomer which is dialdehyde-reactive and the cationic comonomer are copolymerized in the desired ratio to a useful molecular weight. In the second step, the resulting copolymer is reacted with dialdehyde, preferably glyoxal, to produce the reactive cationic resin.

The molecular weight of the copolymer must be such that it can be readily crosslinked to a high molecular weight resin, which is stable against gelation for some period of time and has a solids content to be of commercial value. Copolymers having a reduced specific viscosity of at least about 0.1 dL/g, preferably in the range of between about 0.1 to about 0.5 dL/g, are considered to have a sufficient molecular weight to be of use in the resins of the present invention.

Herein, molecular weight may be expressed in terms of a material's reduced specific viscosity ("RSV") of 2% of a material in 1 M aqueous $NH_4Cl$ at 25° C.

The material's RSV was determined using the following method. RSV of a 2% solution of the material in 1 M aqueous $NH_4Cl$ is determined at 25° C. by means of a Ubbelohde viscometer and a Brinkmann Viscotimer. Flow times of the 2% material solution and the pure solvent are measured and the relative viscosity (Nrel) calculated. The reduced specific viscosity is calculated from the relative viscosity. This method is based on ASTM D446.

Apparatus
1. Ubbelohde Viscometer tubes, No. 1, with Viscometer Constant C=0.01—available from Visco Systems, Yonkers, N.Y., or Schott, Hofheim, Germany, or Brinkmann Instruments.
2. Brinkmann Viscotimer C—available from Brinkmann Instruments Inc., Cantiague Rd., Westbury, N.Y. 11590.
3. Ubbelohde Viscometer Support—ibid., Cat. No. 21-00-032-9.
4. Constant temperature water bath maintained at 25+/−0.1° C.

Cooling capability (cold water or ice pack) may be necessary to maintain constant temperature. An ASTM 45C thermometer should be used to monitor the temperature near the viscometer tube mounting location.
(1) Volumetric flask, 50 mL, Class A.
(2) Beaker, 10 mL.
(3) ASTM 45C thermometer, calibrated, designed for measurements at 25° C. with 0.05 degree divisions—available from VWR Scientific, Cat. No. 61118-923, or equivalent.
(4) Source of vacuum—Preferably a water aspirator for cleaning of viscometers.
(5) Filter or stainless steel screen, ca. 100 mesh.

Reagents
1. Ammonium chloride, granular. ACS reagent grade.
2. Solvent (1 M $NH_4Cl$). Add 53.5+/−0.1 g of $NH_4Cl$ to a 1-liter volumetric flask, dilute to volume with distilled water and mix.

Preferably, the reactive cationic resins of the present invention have a solids content of at least about 20% by weight, more preferably in the range of between about 20% to about 50% by weight.

In order for the reaction between the copolymer and the dialdehyde to proceed in a controlled way, it is advantageous if the copolymers used in this invention have a limited polydispersity, preferably between 2 and 4.

Initiating Systems

Copolymerization of comonomer which is dialdehyde-reactive and a cationic comonomer is carried out by a radical polymerization in an aqueous solution using a redox initiating system such as a combination of sodium metabisulfite and sodium persulfate to provide relatively low and controlled molecular weight copolymers having low residual monomers. Many other combination of redox initiating systems are useful in initiating polymerization of the comomomers to form copolymers used to form the resins of the present invention, including other persulfate salts such as potassium persulfate or ammonium persulfate or other components such as potassium bromate. Some of these redox initiating systems may be used as single component initiators, typically in combination with a chain transfer agent, such as a combination of ammonium persulfate and sodium hypophosphite or sodium persulfate and isopropanol. Other, thermally activated, water-soluble initiators can be used as well, such as using 2,2'-azobis-(2-amidinopropane)dihydrochloride, 4,4'-azobis(4-cyanovaleric acid) and 2,2'-azobis-[2-(-imidazolin-2-yl)propane] dihydrochloride. These can be used alone or in combination with chain transfer agents such as mercaptoethanol or mercaptopropionic acid or others.

Reaction Conditions for Copolymer Manufacture

Polymerization is typically carried out in an aqueous solution at a temperature of at least about 50° C., preferably at a temperature between about 50 and about 100° C., more preferably between about 60 and about 80° C. Isopropanol can be used as a cosolvent to provide efficient heat transfer by reflux as well as functioning as a chain transfer agent. It is sometimes advantageous to raise the temperature after the addition of all comonomers has been completed, to reduce the level of monomers in the product. The pH during the reaction is depending on the initiator used and may be set with a buffer.

Comonomers maybe added at once or added over any length of time. If the cationic comonomer is less reactive than comonomer which is dialdehyde-reactive, it may be advantageous to add part or all of the cationic comonomer initially, followed by a slow or batchwise addition of comonomer which is dialdehyde-reactive and redox initiator system and chain transfer agent. Like wise, initiators maybe added at once or added over any length of time. To reduce the amount of residual monomer in the copolymer, is often advantageous to continue adding the initiator system for some time after all comonomer has been added, or to introduce batchwise additional amounts of initiator.

The amount of the cationic comonomer which is to needed to form the reactive cationic resins of the present invention is greater than 10 mole % of the dialdehyde-reactive copolymer before reaction with dialdehyde. Preferably the amount of cationic comonomer which is to needed to form the reactive cationinc resins of the present invention is greater than about 25 mole % of the dialdehyde-reactive copolymer before reaction with dialdehyde, more preferably greater than about 30 mole %, more preferably greater than about 40 mole %, still more preferably in the range of from about 25 mole % to about 90 mole %, still more preferably in the range of from about 25 mole % to about 40 mole %, still more preferably in the range of from about 30 mole % to about 40 mole %.

Reaction Conditions for Resin Manufacture

To generate the reactive cationic resins of the present invention, the copolymers prepared by reacting comonomer which is dialdehyde-reactive with a cationic comonomer, are in turn reacted with a dialdehyde. Preferred dialdehydes for reaction with the copolymer are glyoxal and $C_1$ to about $C_8$ saturated or unsaturated alkylene or phenylene dialdehydes. Examples of such dialdehydes include malonic dialdehyde, succinic dialdehyde, glutaraldehyde, adipic dialdehyde, 2-hydroxyadipic dialdehyde, pimelic dialdehyde, suberic dialdehyde, azelaic dialdehyde, sebacic dialdehyde, maleic aldehyde, fumaric aldehyde, phthalaldehyde, isophthalaldehyde, terephthalaldehyde, and 1,4-diformylcyclohexane. The most preferred dialdehyde is glyoxal.

This reaction is carried out at a total solids level of 5-25% preferable 8-20%, most preferably between 10 and 16%.

Dialdehyde is added in 1 to 85 weight % relative to the comonomer which is dialdehyde-reactive fraction in the polymer, preferably dialdehyde is added in 15 to 45 weight percent relative to the comonomer which is dialdehyde-reactive content in the polymer. This reaction is typically carried under mild basic to neutral conditions, preferably between pH 7.5 and 10. Dialdehyde may be added at once or over any length of time. The reaction is typically carried out between about 15 and about 40° C., preferably between about 18 and about 25° C. The reaction can be carried out at the final dilution of the product, or can be diluted continuously or in steps during the reaction.

At some point in time during the reaction, the viscosity of the reaction mixture of copolymer and dialdehyde will start to increase. Typically, further progression of the reaction is stopped or greatly reduced by acidification of the reaction mixture to a pH of 5 or below, preferably a pH in the range of about 2 to 5, preferably a pH in the range of about 2.5 to 4, at some desired viscosity.

Charge density of the reactive cationic resins of the present invention may can be determined based on the known structure of the resin by calculating as follows: charge density (meq/g)=1000/molecular weight per charge.

To measure the charge density of the reactive cationic resins of the present invention, the following method is used.

Charge Density

This method is used for determining the charge density of materials at a pH of 8.0. A colloid titration is used. Charge density is the amount of cationic charge per unit weight, in milliequivalents per gram of product solids.

The sample is titrated with potassium polyvinyl sulfate (PVSK or KPVS) or polyethylene sodium sulfonate (PES-Na) to a 0 mV potential. A Mutek particle charge detector, or its equilivalent, is used for end point detection. The charge density is calculated from the titration results, on a dry solids basis. A total solids measurement on the sample is required for this determination.

Apparatus (1) Mutek particle charge detector, Model PCD 03, with measuring cell and piston—available from BTG/Muetek Analytic Inc., 2815 Colonnades Ct., Norcross, Ga., or BTG/Mütek Analytic GmbH, Herrsching, Germany.

(2) Teflon splash ring (3) Autotitrator, Brinkmann Titrino 794, 798, 716 DMS, or equivalent, with printer or PC and titration software. Use a fixed titration rate (MET U mode, 0.1 mL/dose, 5 sec. equilibrium time).

(4) Titrator delivery tip—Anti-diff buret tip 6.1543.200, ibid, Cat. No. 020-68-324-4.

(5) Adapter cable, to connect Mutek with titrator—available from Muetek or Brinkmann (Brinkmann Cat. No. 20 97 739-6 for Titrino 716, Cat. No. 20-97-768-0 for Titrino 794).

(6) Pipet or volumetric dispenser, 10 mL.

(7) Volumetric digital pipet, EDP-Plus Pipette, 2.5 mL—available from Rainin Instrument Co., Woburn, Mass., Cat. No. EP-2500, or glass pipet, 2.00 mL, Class A.

(8) Volumetric flask, 2-L.

Reagents (1) Anionic titrant solution, 0.500 mN—
  (a) Potassium polyvinyl sulfate (PVSK) titrant solution, 0.500 mN—prepare by diluting 0.001 N PVSK (BTG/Muetek No. 811-10216) to one-half the supplied concentration; or
  (b) Polyethylene sodium sulfonate (PES-Na) titrant solution, 0.500 mN—prepare by diluting 0.001 N PES-Na to one-half the supplied concentration; or, using dry powder PES-Na, prepare by weighing, to the nearest 0.0001 g, 0.064 g of dry powder PES-Na into a 100 mL beaker. Rinse the sides of the beaker, add approximately 50 mL of distilled water, and stir until the powder is completely dissolved. Quantitatively transfer this solution to a 1-L volumetric flask and dilute to the mark with distilled water. Mix well. Calculate the exact normality of this solution using Equation (1).
The anionic titrant solution is a primary standard and need not be standardized
(2) Sodium phosphate, monobasic ($NaH_2PO_4 \cdot H_2O$), reagent grade.
(3) Sodium phosphate, dibasic ($Na_2HPO_4$), reagent grade.
(4) Monobasic sodium phosphate stock solution—Prepare a 0.01 M solution by weighing 1.38 g of monobasic sodium phosphate into a 1-L volumetric flask. Dilute to volume with distilled water and mix well.
(5) Dibasic sodium phosphate stock solution—Prepare a 0.05M solution by weighing 7.10 g of dibasic sodium phosphate into a 1-L volumetric flask. Dilute to volume with distilled water and mix well.
(6) Phosphate buffer solution, 0.01 M, pH 8.0—Pipet 72.5 mL of the 0.01 M monobasic solution into a 2-liter beaker and add about 600 mL of distilled water. Add 0.05M dibasic sodium phosphate until a pH of 8.0 is reached (ca. 186 mL, depending upon the pH of the distilled water). Dilute to 1 L with distilled water. Check the pH of this buffer solution periodically and readjust as needed.
(7) Acetone
(8) Sodium Bromide (NaBr)—available from VWR Scientific, Cat. No. EM-SX0390-1, or equivalent.

Procedure

Charge Measurement:
(1) Determine percent total solids of the resin sample, using the appropriate total solids method.
(2) Calculate the amount of resin required, to prepare a 0.125% sample solution, using the percent total solids (TS) of the sample and Equation 2.
(3) Weigh the calculated amount of well mixed sample into a 100 mL volumetric flask. Record the weight to the nearest 0.0001 g.
(4) Add approximately 75 mL of distilled water and mix well.
(5) Dilute to the mark with distilled water and mix thoroughly.
(6) Pipet 2.00 mL of the sample solution into the Mutek measuring cell, then pipet or dispense 8.0 mL of pH 8 buffer solution into the cell. Gently insert the piston, with the piston ring (positioned midway), into the measuring cell.
(7) Slide the measuring cell along the Mutek guide all the way to the rear. The electrode should face toward the rear.
(8) Pull the piston upward, in the proper orientation, and twist to lock it in the instrument.
(9) Discharge a portion of titrant to waste, then insert the titrator tubing tip into the measuring cell. Make sure the tip is touching the solution and away from the piston.
(10) Allow the mV reading to stabilize, then titrate with the anionic titrant at a specified, constant titration rate (0.1 mL/dose, 5 sec. equilibration; or 0.85 mL./min.) to a fixed end point of 0 mV potential. Duplicate charge density titrations are recommended. If the initial mV reading does not stabilize, the measuring cell may be dirty.
(11) If the charge density is not displayed by the titrator, record the volume of titrant used, and calculate the charge density using Equation 3. Average duplicate results.

Calculations $$(Wp \times 0.5)/Wd = N \qquad \text{Eq (1)}$$

where:
Wp=weight of dry powder PES-Na diluted to 2 L, g
Wd=desired weight of dry powder PES-Na per Mutek instructions, 0.128 g, for 1 L of 1 mN solution
N=concentration of the PES-Na titrant (approx. 0.500 mN)
0.5=desired normality.

$$((0.125\,g)/TS) \times 100\% = \text{Weight of Sample} \qquad \text{Eq(2)}$$

where:
TS=total solids of the sample, %
0.125=desired weight of resin solids $$(S \times N \times 10)/(W \times TS \times Vs) = \text{Charge density, meq/g} \qquad \text{Eq (3)}$$

where:
S=sample titration volume, mL
N=concentration of the anoinic titrant, 0.500 mN
W=weight of sample used in preparing the sample solution, ~1 g
TS=total solids of the sample, %
10=100×100/1000, sample dilution×TS unit conversion/L to mL conversion
Vs=volume of diluted sample solution, 2.00 mL.

Report

Report the charge density to the nearest 0.01 meq/g.

Papermaking Systems

These resins are added as a wet-end paper chemicals in papermaking systems. Preferably these resins are added at a point where the fibers are still relatively concentrated ("thick stock"). Addition levels where the resins of the current invention provide economical benefits to the papermaker are in the range of from about 0.05 to about 1% relative to dry fiber weight range, preferably in about 0.1 to about 0.5% range. The pH of the papermaking slurry is preferably between about 4 and about 8.5, preferably between about 5 and about 7.5.

The resins made according to present invention are of utility when applied in sulfite containing papermaking systems. Such papermaking systems are typically producing paper at least partly based on bleached or brightened fibers obtained by mechanical means. Such paper is typically produced for the publication grade market segment, and includes newsprint and light weight coated paper. It is understood that in many cases mixtures of mechanically and (semi) chemically or otherwise obtained fibers may be used in papermaking systems in which the resins of the current invention can be advantageously applied. It is also understood that the resins can be of use when applied in non-mechanical paper grades, such as papers based on bleached- or unbleached-, hardwood- or softwood-fiber or on secondary fiber, such as recycled fiber or deinked pulps. The sulfite level in the papermaking slurry can encompass a wide range from about 0 to about 700 ppm of sulfite without affecting the efficiency of the reactive cationic resins of the current invention. "High sulfite conditions" is defined herein as a sulfite level found in a papermaking slurry greater than 20 ppm. Reactive cationic resins of the present invention efficiently impart strength to paper even under high sulfite conditions. The reactive cationic resins of the present invention may be added to papermaking slurries when sulfite is present in the range of greater than about 20 ppm to about 250 ppm, more preferably in the range from about 50 ppm to about 200 ppm.

Finally, while there are particular benefits associated with the use of resins according to the present invention in the presence of sulfite, it is understood that these resins may be applied in papermaking systems which are not under high sulfite conditions and still provide benefits over conventional glyoxalated resins in specific cases or for specific purposes. For example, the use of resins according to the present invention may have utility when applied in papermaking systems which have a conductivity of greater than 1.5 mS/cm. The conductivity may be determined by testing methods known in the art, such TAPPI Test Method: T252, "pH and electrical conductivity of hot water extracts of pulp, paper, and paperboard", for example.

Combination with (bio)Polymers and/or Other Resins

The resins of the current invention can be added alone to provide strength benefits, or in combination with conventional paper making strength additives. These additives include cellulose derivatives, such as carboxymethyl cellulose, cationic-, anionic-, amphoteric-, and uncharged starches and cationic, anionic, amphoteric, and uncharged synthetic polymers, such poly(acrylamide) and copolymers, and reaction products of these with epichlorohydrin, poly(ethyleneimine)s, poly(vinyl alcohol)s, poly(N-vinylformamide)s, poly(vinylamine)s and reaction products of poly(amidoamines) with epichlorohydrin. Also these resins provide strength benefits in the presence of other glyoxalated resins, such as glyoxalated cationic, anionic, amphoteric, and uncharged poly(acrylamides). In particular, combinations with starch and/or copolymers of acrylic acid and acrylamide or glyoxalated copolymers of acrylic acid and acrylamide are beneficial.

Other ingredients can be used in conjunction with the resins of this invention. The additives or ingredients commonly used in papermaking can be used here also as for example alum, rosin size, coating colors, mineral fillers, starch, casein, etc. The presence of other ingredients is not essential to this invention and excellent results are achieved when using only the resins of this invention.

Generally, the process of manufacturing paper comprises three principal steps: (1) forming an aqueous suspension of cellulosic fibers; (2) adding a strengthening additive, such as a wet-strength and or dry-strength resin; (3) sheeting and drying the fibers to form a desired cellulosic web.

The first step of forming an aqueous suspension of cellulosic fibers is performed by conventional means, such as known mechanical, chemical and semichemical, etc., pulping processes. After mechanical grinding and/or chemical pulping step, the pulp is washed to remove residual pulping chemicals and solubilized wood components. These steps are well known, as described in, e.g., Casey, Pulp and Paper (New York, Interscience Publishers, Inc. 1952).

The second step may be carried out by adding the strengthening additive directly to the papermaking system. Individual components and blends of components may be in a dry form or they may be in aqueous systems.

The third step of sheeting and drying the fibers to form a cellulosic web may be carried out according to conventional means, such as those described in e.g., Casey, Pulp and Paper (New York, Interscience Publishers, Inc. 1952).

The reactive cationic resins of the present invention can be added to the papermaking process at any point in the process where strength resins are presently added, and preferably the resins are added to the paper as aqueous solution. The resins of the invention can be added at any time before, during or after the paper is formed. For example, the resin can be added before or after the refining of the pulp, at the fan pump or head box, or by spraying on the wet web. The resin can also be added to preformed paper by tub sizing or spraying on the dried paper sheets. In most commercial papermaking, it is preferred to add the resin at the fan pump or head box in the form of an aqueous solution. Various amounts of resin can be used. The actual amount of resin used in the paper can be easily determined by one skilled in the art.

The following examples will serve to illustrate the invention, parts and percentages being by weight unless otherwise indicated.

EXAMPLES

Example 1 a. Synthesis of dialdehyde-reactive copolymers useful in the production of reactive cationic resins.

b. This example describes preparation of a dialdehyde-reactive copolymer in which a cationic comonomer, DADMAC, and a comonomer which is dialdehyde-reactive, acrylamide, are reacted together and wherein the resultant copolymer comprises 30 mole % DADMAC.

c. In a jacketed one-liter glass reactor, connected to a thermostatic bath, with a five necked lid, equipped with a stirrer, temperature probe, nitrogen inlet plus cooler and two dosing points connected to four dosing pumps 68 grams of DADMAC (65% aqueous solution, Aldrich) and 316 grams of demi water were purged with nitrogen for one hour. Initiators solution of 2.6 grams of sodium metabisulfite in 52 grams of water and 0.3 grams of SPDS in 54 grams of water were prepared. Both solutions were purged for 30 minutes with nitrogen prior to dosing.

d. After the nitrogen purge, the mixture was heated to 65° C. under gentle stirring. When the DADMAC/water mixture reached 65° C. the initiator feed pumps were started at a dosing rate of 0.4 grams/minute, 271.3 grams of acrylamide solution (50% solution in water) were dosed in 120 minutes (dosing rate of 2.3 g/min) and 135.6 grams of DADMAC solution were dosed in 80 minutes (dosing rate of 1.7 g/min). The reactor was kept at 65° C. during the dosing period. After the dosing period the reactor was heated to 80° C. and the initiators were fed for another 20 minutes. The reactor was kept at 80° C. for a total of one hour. Reaction product was cooled and stored at ambient temperature and solids were found at 33.4%. Reduced viscosity was determined of a 2% solution in 1 N $NH_4Cl$ and found to be 0.24 dL/g.

Example 2

This example describes preparation of a dialdehyde-reactive copolymer in which a cationic comonomer, DADMAC, and a comonomer which is dialdehyde-reactive, acrylamide, are reacted together and wherein the resultant copolymer comprises 30 mole % DADMAC.

In a jacketed one-liter glass reactor, connected to a thermostatic bath, with a five necked lid, equipped with a stirrer, temperature probe, nitrogen inlet plus cooler and two dosing points connected to three dosing pumps 203 grams of DADMAC (65% aqueous solution, Aldrich) and 316 grams of demi water were purged with nitrogen for one hour. Initiators solution of 2.6 grams of sodium metabisulfite in 52 grams of water and 0.3 grams of SPDS in 54 grams of water were prepared. Both solutions were purged for 30 minutes with nitrogen prior to dosing.

After the nitrogen purge, the mixture was heated to 65° C. under gentle stirring. When the DADMAC/water mixture reached 65° C. the initiator feed pumps were started at a dosing rate of 0.4 grams/minute, 271.3 grams of acrylamide solution (50% solution in water) were dosed in 120 minutes (dosing rate of 2.3 g/min. The reactor was kept at 65° C. during the dosing period. After the dosing period the reactor was heated to 80° C. and the initiators were fed for another 30 minutes. Reaction product was cooled and stored at ambient temperature and solids were found at 31.5%. Reduced viscosity was determined of a 2% solution in 1 N NH$_4$Cl and found to be 0.26 dL/g.

Example 3

This example describes preparation of a dialdehyde-reactive copolymer in which a cationic comonomer, DADMAC, and a comonomer which is dialdehyde-reactive, acrylamide, are reacted together and wherein the resultant copolymer comprises 30 mole % DADMAC, and wherein the resultant copolymer contains a low level of residual monomer.

In a jacketed one-liter glass reactor, connected to a thermostatic bath, with a five necked lid, equipped with a stirrer, temperature probe, nitrogen inlet plus cooler and two dosing points connected to three dosing pumps, 136.7 grams of DADMAC (65% aqueous solution, Aldrich) and 195.8 grams of demi water were purged with nitrogen for one hour. Initiator solution of 4.92 grams of sodium metabisulfite in 46.2 grams of water and 1.32 grams of SPDS in 49.8 grams of water were prepared. Both solutions were purged for 30 minutes with nitrogen prior to dosing.

After the nitrogen purge, the mixture was heated to 75° C. under gentle stirring. When the DADMAC/water mixture reached 75° C. the initiator feed pumps were started at a dosing rate of 0.18 grams/minute, 182.3 grams of acrylamide solution (50% solution in water) were dosed in 120 minutes (dosing rate of 2.3 g/min. The reactor was kept at 75° C. during the dosing period. After the acrylamide-dosing period the reactor was heated to 85° C. and the initiators were fed for another 120 minutes. Reaction product was cooled and stored at ambient temperature and solids were found at 31.5%. Reduced viscosity was determined of a 2% solution in 1 N NH$_4$Cl and found to be 0.28 dL/g.

Example 4

This example describes preparation of a dialdehyde-reactive copolymer in which a cationic comonomer, DADMAC, and a comonomer which is dialdehyde-reactive, acrylamide, are reacted together and wherein the resultant copolymer comprises 10 mole % DADMAC.

In a jacketed one-liter glass reactor, connected to a thermostatic bath, with a five necked lid, equipped with a stirrer, temperature probe, nitrogen inlet plus cooler and two dosing points connected to four dosing pumps 28 grams of DADMAC (65% solution, Aldrich) and 257 grams of demi water were purged with nitrogen for one hour. Initiators solution of 2.6 grams of sodium metabisulfite in 67 grams of water and 0.3 grams of SPDS in 67 grams of water were prepared. Both solutions were purged for 30 minutes with nitrogen prior to dosing.

After the nitrogen purge, the mixture was heated to 65° C. under gentle stirring. When the DADMAC/water mixture reached 65° C. the initiator feed pumps were started at a dosing rate of 0.5 grams/minute, 426 grams of acrylamide solution (50% solution in water) were dosed in 120 minutes (dosing rate of 3.6 g/min) and 135.6 grams of DADMAC solution were dosed in 80 minutes (dosing rate of 0.7 g/min). The reactor was kept at 65° C. during the dosing period. After the dosing period the reactor was heated to 80° C. and the initiators were fed for another 20 minutes. Reaction product was cooled and stored at ambient temperature and solids were found at 33.4%. Reduced viscosity was determined of a 2% solution in 1 N NH$_4$Cl and found to be 0.29 dL/g.

Example 5

This example describes preparation of a dialdehyde-reactive copolymer in which a cationic comonomer, DADMAC, and a comonomer which is dialdehyde-reactive, acrylamide, are reacted together and wherein the resultant copolymer comprises 20 mole % DADMAC.

In a jacketed one-liter glass reactor, connected to a thermostatic bath, with a five necked lid, equipped with a stirrer, temperature probe, nitrogen inlet plus cooler and two dosing points connected to four dosing pumps. 50 grams of DADMAC (65% solution, Aldrich) and 291 grams of demi water were purged with nitrogen for one hour. Initiators solution of 2.6 grams of sodium metabisulfite in 67 grams of water and 0.3 grams of SPDS in 67 grams of water were prepared. Both solutions were purged for 30 minutes with nitrogen prior to dosing.

After the nitrogen purge, the mixture was heated to 65° C. under gentle stirring. When the DADMAC/water mixture reached 65° C. the initiator feed pumps were started at a dosing rate of 0.5 grams/minute, 340 grams of acrylamide solution (50% solution in water) were dosed in 120 minutes (dosing rate of 2.8 g/min) and 99 grams of DADMAC solution were dosed in 80 minutes (dosing rate of 1.23 g/min). The reactor was kept at 65° C. during the dosing period. After the dosing period the reactor was heated to 80° C. and the initiators were fed for another 20 minutes. Reaction product was cooled and stored at ambient temperature and solids were found at 32.4%. Reduced viscosity was determined of a 2% solution in 1 N NH$_4$Cl and found to be 0.25 dL/g.

Example 6

This example describes preparation of a dialdehyde-reactive copolymer in which a cationic comonomer, DADMAC, and a comonomer which is dialdehyde-reactive, acrylamide, are reacted together and wherein the resultant copolymer comprises 40 mole % DADMAC.

In a jacketed one-liter glass reactor, connected to a thermostatic bath, with a five necked lid, equipped with a stirrer, temperature probe, nitrogen inlet plus cooler and two dosing points connected to four dosing pumps 83 grams of DADMAC (65% solution, Aldrich) and 339 grams of demi water were purged with nitrogen for one hour. Initiators solution of 2.6 grams of sodium metabisulfite in 67 grams of water and 0.3 grams of SPDS in 67 grams of water were prepared. Both solutions were purged for 30 minutes with nitrogen prior to dosing.

After the nitrogen purge, the mixture was heated to 65° C. under gentle stirring. When the DADMAC/water mixture reached 65° C. the initiator feed pumps were started at a dosing rate of 0.4 grams/minute, 213 grams of acrylamide solution (50% solution in water) were dosed in 120 minutes (dosing rate of 1.8 g/min) and 165 grams of DADMAC solution were dosed in 80 minutes (dosing rate of 2.1 g/min). The reactor was kept at 65° C. during the dosing period. After the dosing period the reactor was heated to 80° C. and the initiators were fed for another 20 minutes. Reaction product was cooled and stored at ambient temperature and solids were found at 33.1%. Reduced viscosity was determined of a 2% solution in 1 N NH$_4$Cl and found to be 0.22 dL/g.

Example 7

Resin obtained by glyoxalation of the copolymer from example 1 at 12% solids.

In a one liter glass beaker with a pH probe and magnetic stirrer bar, 265.5 grams of a copolymer according to Example 1, 33.3 grams of glyoxal (total solids=40%, Aldrich) and 551.2 grams of demi water were mixed. The pH was adjusted to approx. 9.0 with 2.0 grams of a 10% caustic solution. After 20 minutes the pH was readjusted to 9.0 with 0.27 grams of 10% caustic solution. The viscosity increase was monitored with a Spurlin Spence tube (1.47 mm bore). At a Spurlin-Spence viscosity of 80 seconds, the reaction was terminated by a pH adjustment to pH 3 with 0.80 grams of a 25% H$_2$SO$_4$ solution.

The total solids are 11.5%. Reduced viscosity was determined of 2% solution in 1 N $NH_4Cl$ and found to be 0.69 dL/g.

Example 8

Resins obtained by glyoxalation of copolymers from examples 2-6 at 2% solids.

In procedures similar to procedures in Example 7, copolymers from examples 2-6 were reacted with glyoxal, in such a way that the amount of glyoxal added was equal to 30% by weight of the acrylamide fraction in the copolymer backbone. The resins produced had properties as in Table 1.

TABLE 1

Characteristics of resins made according to Example 8

| Resin | Copolymer composition | Total solids (%) | Residual free glyoxal (%) | Reduced viscosity (dL/g) | Charge density (meq/g) |
|---|---|---|---|---|---|
| Resin 8A | As in example 2 | 11.5 | 0.82 | 0.67 | 2.5 |
| Resin 8B | As in example 4 | 11.8 | 1.51 | 0.63 | 1.1 |
| Resin 8C | As in example 5 | 11.4 | 1.02 | 0.74 | 1.9 |
| Resin 8D | As in example 6 | 11.7 | 0.42 | 0.69 | 3.1 |

Example 9

Resins obtained by glyoxalation of a copolymer similar to example 2 at 15% and 19% solids.

A) In a 1000 mL glass beaker with a pH probe and magnetic stirrer bar, 232 grams of a copolymer similar to Example 2, at 29.9% solids, 26.1 grams of glyoxal (total solids=40%, Aldrich) and 241 grams of demi water were mixed. The pH was adjusted to approx. 9.2 with 1.1 grams of a 10% caustic solution. The viscosity increase was monitored with a Spurlin Spence tube (1.47 mm bore). At a Spurlin-Spence viscosity of 61 seconds the reaction was terminated by a pH adjustment to pH 3 with 0.7 grams of a 25% $H_2SO_4$ solution. The total solids are 15.3%. Reduced viscosity was determined of 2% solution in 1 N $NH_4Cl$ and found to be 0.55 dL/g.

B) In a 1000 mL glass beaker with a pH probe and magnetic stirrer bar, 261 grams of a copolymer similar to Example 2, at 29.9% solids, 29.4 grams of glyoxal (total solids=40%, Aldrich) and 159 grams of demi water were mixed. The pH was adjusted to approx. 9.2 with 1.9 grams of a 10% caustic solution. The viscosity increase was monitored with a Spurlin Spence tube (1.47 mm bore). At a Spurlin-Spence viscosity of 61 seconds the reaction was terminated by a pH adjustment to pH 3 with 0.7 grams of a 25% $H_2SO_4$ solution. The total solids were 19.4%. Reduced viscosity was determined of 2% solution in 1 N $NH_4Cl$ and found to be 0.43 dL/g.

Example 10

Resins obtained by glyoxalation from the copolymer of Example 1 at different glyoxal levels.

In procedures similar to Example 7, the copolymer from Example 1 was reacted with 15, 30, 60 and 81% of glyoxal relative to the acrylamide weight fraction in the copolymer. The resins produced had properties as in Table 2.

TABLE 2

Characteristics of resins made according to Example 10

| Copolymer composition | Amount of glyoxal added (%)* | Total solids (%) | Reduced viscosity (dL/g) |
|---|---|---|---|
| As in example 1 | 15 | 11.6 | 0.83 |
| As in example 1 | 30 | 11.2 | 0.79 |
| As in example 1 | 60 | 11.7 | 0.63 |
| As in example 1 | 81 | 11.5 | 0.62 |

*relative to the acrylamide weight fraction in the copolymer

Example 11

Resins obtained by glyoxalation of a copolymer similar to the copolymer from example 2 to different viscosities In a procedure similar to the procedure outlined in example 7, resins viscosities were allowed to increase to viscosities of 29, 44 and 72 second Spurlin-Spence respectively. The product characteristics are shown in Table 3.

TABLE 3

Characteristics of resins made according to Example 11

| Resin | Terminal viscosity (s Spurlin Spence) | Solids (%) | Reduced viscosity (dL/g) | Residual glyoxal (%) |
|---|---|---|---|---|
| Resin 11A | 29 | 11.4 | 0.49 | 0.92 |
| Resin 11B | 44 | 11.5 | 0.67 | 0.82 |
| Resin 11C | 72 | 11.6 | 0.88 | 0.79 |

Example 12

This example describes the use of resins of the present invention in making paper useful in producing newsprint.

A papermaking furnish was prepared based on 90% thermo mechanical pulp refined to a Canadian Standard Freeness of 123 ml and 10% softwood Kraft pulp refined to refined to a Canadian Standard Freeness of 486 ml. To this suspension was added sulfite so that the concentration of the sulfite ion at the wire would be 100 ppm. To this suspension was also added pectin as an anionic trash simulant so that the concentration of the pectin equaled 100 ppm. The pH of the papermaking suspension was controlled at 5 and paper was made at a basis weight of 30 lbs/ream.

A copolymer based on 80 mole % acrylamide and 20% diallyldimethylammonium chloride, similar to the copolymer prepared in Example 4, was reacted with glyoxal according to the procedure in Example 6 using 27% and 54% by weight of glyoxal relative to the copolymer solids level to provide respectively resin A and resin B. A reference resin, comprising a glyoxalated copolymer of 95 mole % acrylamide and 5 mole % diallyldimethylammonium chloride (Hercobond® 1000 resin, available from Hercules Incorporated, Wilmington, Del.) was obtained.

The resins were added to papermaking slurry in such a way that the dry weight of the resin was 0.5% by weight of the dry fiber present in the papermaking slurry. A typical commercial retention aid was added at a dose level of 125 ppm. Paper was made on a small scale papermaking machine and evaluated for Mullen burst strength, dry tensile strength and wet strength after a soak of 1 minute in water (wet tensile strength). The results for dry and wet tensile strengths were obtained as geometric means of the individual strength in machine direction and cross direction. The results are expressed as a percentage of the strength of untreated paper (blank) in Table 4.

TABLE 4

Paper properties of paper made according to example 12, with addition of glyoxalated resin at a dose level of 0.5%, expressed relative to the strength of untreated paper

| Resin | Dry tensile strength (% blank) | Mullen Burst strength (% blank) | Wet tensile strength (% blank) |
|---|---|---|---|
| Reference resin | 101 | 100 | 134 |
| Resin A | 105 | 112 | 183 |
| Resin B | 105 | 110 | 188 |

This example shows that whereas the reference resin provides hardly any benefit for dry strength under the papermaking conditions applied, resins A and B, based on glyoxalated copolymers containing 20 mole % cationic comonomer, provide significant benefits for dry strength. Furthermore, resins A and B provide much more wet strength under the papermaking conditions applied.

Example 13

This example demonstrates the effectiveness of resins of the present invention in hardwood/softwood furnish mixtures at different sulfite levels.

A papermaking furnish was prepared based on 50%/50% bleached hardwood/softwood mixture to a Schoppen Riegler Freeness of 330. To this suspension was added sulfite so that the concentration of the sulfite ion at the wire would be 0, 200 or 400 ppm. The pH of the papermaking suspension was controlled between 5 and 5.4 and paper was made at a basis weight of 65 grams per square meter.

A copolymer based on 80 mole % acrylamide and 20% diallyldimethylammonium chloride, similar to the copolymer prepared in Example 5, was reacted with glyoxal according to the procedure in Example 7 using 28% by weight of glyoxal relative to the copolymer solids level to provide resin C. A reference resin, comprising a glyoxalated copolymer of 95 mole % acrylamide and 5 mole % diallyldimethylammonium chloride (Hercobond® 1000 resin, available from Hercules Incorporated, Wilmington, Del.) was obtained.

The resins were added to papermaking slurry in such a way that the dry weight of the resin was 0.3% by weight of the dry fiber present in the papermaking slurry. Paper was made on a small scale papermaking machine and evaluated for Mullen burst strength, dry tensile strength Scott Bond internal strength and wet strength after a soak of 2 hours in water (wet tensile strength). The results for dry strength were obtained as geometric means of the individual strength in machine direction and cross direction. The results are expressed as a percentage of the strength of untreated paper (blank) in Table 5.

TABLE 5

Paper properties of paper made according to Example 13, with addition of glyoxalated resin at a dose level of 0.3%, expressed relative to the strength of untreated paper, at three different sulfite levels.

| Sulfite level (ppm) | Resin | Dry tensile strength (% blank) | Mullen Burst strength (% blank) | Scott Bond internal strength (% blank) | Wet tensile strength (% blank) |
|---|---|---|---|---|---|
| 0 | Reference resin | 108 | 115 | 133 | 610 |
| 0 | Resin C | 106 | 121 | 137 | 583 |
| 200 | Reference resin | 105 | 106 | 111 | 143 |
| 200 | Resin C | 108 | 116 | 126 | 246 |

TABLE 5-continued

Paper properties of paper made according to Example 13, with addition of glyoxalated resin at a dose level of 0.3%, expressed relative to the strength of untreated paper, at three different sulfite levels.

| Sulfite level (ppm) | Resin | Dry tensile strength (% blank) | Mullen Burst strength (% blank) | Scott Bond internal strength (% blank) | Wet tensile strength (% blank) |
|---|---|---|---|---|---|
| 400 | Reference resin | 100 | 102 | 102 | 114 |
| 400 | Resin C | 102 | 112 | 112 | 169 |

This example shows that the performance of the reference resin decreases with increasing sulfite levels, to the point where virtually no additional dry strength is provided at 400 ppm sulfite and that, in the presence of sulfite, the resins described in this invention can significantly outperform the reference resin.

Example 14

This example demonstrates the effect of increasing levels of cationic comonomer in resins of the present invention in hardwood/softwood furnish mixtures.

Papermaking in HW/SW furnish illustrating the effect of increasing levels of cationic comonomer A papermaking furnish was prepared based on 50%/50% bleached hardwood/softwood mixture to a Schopper Riegler Freeness of 36°. To this suspension was added sulfite so that the concentration of the sulfite ion at the wire would be 300 ppm. The pH of the papermaking suspension was controlled between 5 and 5.4 and paper was made at a basis weight of 65 grams per square meter.

The resins of example 8 were used and a reference resin, comprising a glyoxalated copolymer of 95 mole % acrylamide and 5 mole % diallyldimethylammonium chloride (Hercobond® 1000 resin, available from Hercules Incorporated, Wilmington, Del.) was obtained.

The resins were added to the papermaking slurry in such a way that the dry weight of the resin was 0.3% by weight of the dry fiber present in the papermaking slurry. Paper was made on a small scale papermaking machine and evaluated for dry tensile strength Scott Bond internal strength and wet strength after a soak of 10 seconds and 2 hours in water (wet tensile strength). The results for dry strength were obtained as geometric means of the individual strength in machine direction and cross direction. The results are expressed as a percentage of the strength of paper treated with the reference resin in Table 6.

TABLE 6

Paper properties of paper made according to Example 14, with addition of glyoxalated resin at a dose level of 0.3%, expressed relative to the strength of paper treated with the reference resin, using resins based on glyoxalated copolymers containing different levels of cationic comonomer.

| Resin | DADMAC level in base copolymer (mole %) | Dry tensile strength (% ref. paper) | Scott Bond internal strength (% ref. Paper) | Wet tensile strength (10 s) (% ref. paper) | Wet tensile strength (2 h) (% ref. Paper) |
|---|---|---|---|---|---|
| Reference resin | 5 | 100 | 100 | 100 | 100 |
| Resin according to example 8 (B) | 10 | 103 | 99 | 98 | 111 |
| Resin according to example 8 (C) | 20 | 106 | 111 | 165 | 186 |
| Resin according to example 7 | 30 | 106 | 118 | 172 | 215 |

TABLE 6-continued

Paper properties of paper made according to Example 14, with addition of glyoxalated resin at a dose level of 0.3%, expressed relative to the strength of paper treated with the reference resin, using resins based on glyoxalated copolymers containing different levels of cationic comonomer.

| Resin | DADMAC level in base copolymer (mole %) | Dry tensile strength (% ref. paper) | Scott Bond internal strength (% ref. Paper) | Wet tensile strength (10 s) (% ref. paper) | Wet tensile strength (2 h) (% ref. Paper) |
|---|---|---|---|---|---|
| Resin according to example 8 (D) | 40 | 104 | 109 | 148 | 178 |

This example shows that the performance of the reference resin increases with increasing amount of cationic comonomer, and that in this particular example there is an optimum at 30 mole % comonomer, and that the resins described in this invention significantly outperform the reference resin.

Example 15

This example demonstrates the effect of different solids levels of resins of the present invention in hardwood/softwood furnish mixtures.

A papermaking furnish was prepared based on 50%/50% bleached hardwood/softwood mixture to a Schoppen Riegler Freeness of 320. To this suspension was added sulfite so that the concentration of the sulfite ion at the wire would be 300 ppm. The pH of the papermaking suspension was controlled between 5 and 5.4 and paper was made at a basis weight of 65 grams per square meter.

The resins of Example 9 were used and a reference resin, comprising a reference resin, comprising a glyoxalated copolymer of 95 mole % acrylamide and 5 mole % diallyldimethylammonium chloride (Hercobond® 1000 resin, available from Hercules Incorporated, Wilmington, Del.) was obtained.

The resins were added to papermaking slurry in such a way that the dry weight of the resin was 0.3% by weight of the dry fiber present in the papermaking slurry. Paper was made on a small scale papermaking machine and evaluated for dry tensile strength, Scott Bond internal strength, and wet tensile strength after a soak of 10 seconds in water. The results for dry strength were obtained as geometric means of the individual strength in machine direction and cross direction. The results are expressed as a percentage of the strength of paper treated with the reference resin in Table 7.

TABLE 7

Paper properties of paper made according to Example 15, with addition of glyoxalated resin at a dose level of 0.3%, expressed relative to the strength of untreated paper, using resins based on glyoxalated copolymers at different solids levels.

| Resin | Solids level (%) | Dry tensile strength (% blank paper) | Scott Bond internal strength (% blank paper) | Wet tensile strength (10 s) (% blank paper) |
|---|---|---|---|---|
| Reference resin | 8 | 102 | 106 | 70 |
| Resin according to example 7 | 12 | 105 | 118 | 180 |
| Resin according to example 9A | 15 | 104 | 120 | 170 |
| Resin according to example 9B | 19 | 103 | 113 | 140 |

This example shows that the performance of the resins described in this invention significantly outperform the reference resin, even when prepared at much higher solids levels.

Example 16

This example demonstrates the effect of papermaking in hardwood/softwood furnish mixtures at different terminal viscosities using resins of the present invention.

A papermaking furnish was prepared based on 50%/50% bleached hardwood/softwood mixture to a Schopper Riegler Freeness of 32°. To this suspension was added sulfite so that the concentration of the sulfite ion at the wire would be 300 ppm. The pH of the papermaking suspension was controlled between 5 and 5.4 and paper was made at a basis weight of 65 grams per square meter.

The resins of Example 11 were used and a reference resin, comprising a glyoxalated copolymer of 95 mole % acrylamide and 5 mole % diallyldimethylammonium chloride (Hercobond® 1000 resin, available from Hercules Incorporated, Wilmington, Del.) was obtained.

The resins were added to papermaking slurry in such a way that the dry weight of the resin was 0.3% by weight of the dry fiber present in the papermaking slurry. Paper was made on a small scale papermaking machine and evaluated for dry tensile strength, Scott Bond internal strength, and wet tensile strength after a soak of 10 seconds in water. The results for dry strength were obtained as geometric means of the individual strength in machine direction and cross direction. The results are expressed as a percentage of the strength of paper treated with the reference resin in Table 8.

TABLE 8

Paper properties of paper made according to Example 16, with addition of glyoxalated resin at a dose level of 0.3%, expressed relative to the strength of untreated paper, using resins based on glyoxalated copolymers at different solids levels.

| Resin | Dry tensile strength (% blank paper) | Scott Bond internal strength (% blank paper) | Wet tensile strength (10 s) (% blank paper) |
|---|---|---|---|
| Reference resin | 101 | 106 | 70 |
| Resin 11A | 104 | 126 | 210 |
| Resin 11B | 105 | 118 | 180 |
| Resin 11C | 106 | 126 | 230 |

This example shows that the performance of the resins described in this invention significantly outperform the reference resin, over a broad range of viscosities.

Example 17

This example demonstrates the benefit of using resins of the present invention in making recycled liner board.

A fully dewatered recycled linerboard stock was diluted with water to a 0.3% consistency and the pH was adjusted to 7. Drainage of this was tested using a Canadian Standard Freeness tester at dosages of 0, 1, 2, 4 and 6 lbs/ton dry furnish.

Resins used were similar to Examples 2, 4 and 6 and a reference resin, comprising a glyoxalated copolymer of 95 mole % acrylamide and 5 mole % diallyldimethylammonium chloride (Hercobond® 1000 resin, available from Hercules Incorporated, Wilmington, Del.) was obtained. The results are summarized in Table 9.

TABLE 9

Drainage properties of resins made according to example 2, 3 and 5 and a commercial reference resin in neutral recycled linerboard

| Dose (lbs/ton) | Reference resin (5 mole % DADMAC in base copolymer) (mL) | Resin made according to ex. 4 (10 mole % DADMAC in base copolymer) (mL) | Resin made according to ex. 2 (30 mole % DADMAC in base copolymer) (mL) | Resin made according to ex. 6 (40 mole % DADMAC in base copolymer) (mL) |
|---|---|---|---|---|
| 0 | 474 | 474 | 474 | 474 |
| 1 | 497 | 530 | 549 | 578 |
| 2 | 517 | 577 | 611 | 627 |
| 4 | 558 | 646 | 654 | 649 |
| 6 | 603 | 675 | 666 | 656 |

This example shows that the performance of the resins described in this invention significantly outperform the reference resin at any dose and that the highest charged resins provides relatively more benefits at lower dosage.

Example 18

This example demonstrates the gelation stability of a resin according to Example 2 relative to a typical commercial resin formulation.

A resin according to Example 2 at 12% solids and a reference resin (Hercobond® 1000 resin, available from Hercules Incorporated, Wilmington, Del.), comprising a glyoxalated copolymer of 95 mole % acrylamide and 5 mole % diallyldimethylammonium chloride obtained at 8% solids, were stored at 25 and 32° C. and the viscosity of the solutions was monitored using a Brookfield LVDVII+device using spindle 1. The results are shown in FIG. 1.

Figure 1:
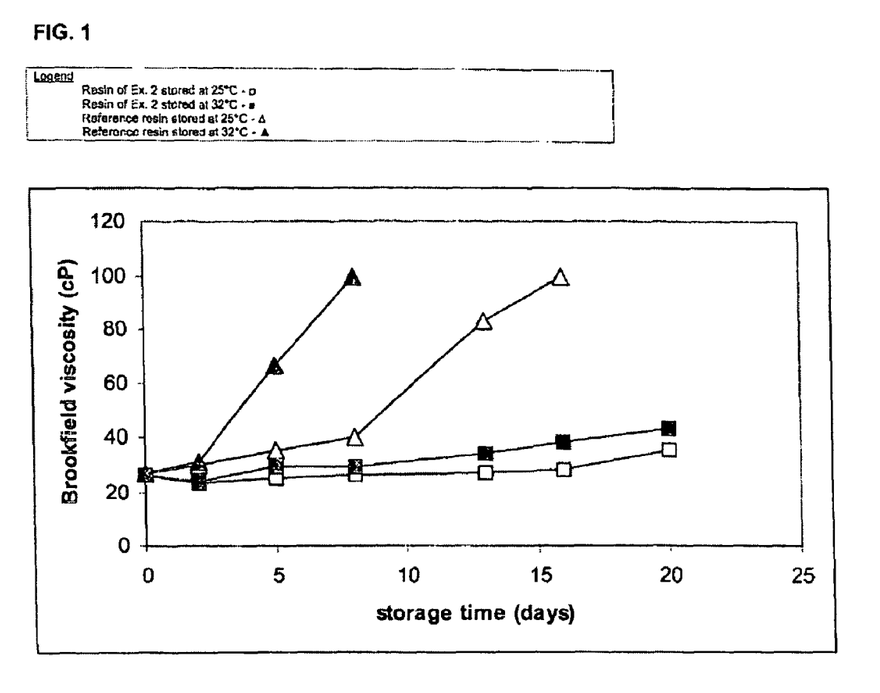
FIG. 1 depicts the gelation stability, as determined by changes in viscosity over time, of a reactive cationic resin according to Example 2 relative to a comparative commercial resin.

FIG. 1, demonstrates that the reactive cationic resins of the present invention, exhibit better stability against gelation than the reference resin, even though the reactive cationic resin of the present invention were tested at higher solids levels. For the purposes of illustration, gelled resins are given a viscosity of 100 cP. Actual values for gelled resins would be greater than 100 cP It is not intended that the examples presented here should be construed to limit the invention, but rather they are submitted to illustrate some of the specific embodiments of the invention. Various modifications and variations of the present invention can be made without departing from the scope of the appended claims.

We claim:

1. A process for making paper with improved strength comprising the steps of:
   a. forming an aqueous suspension of cellulosic fibers wherein the aqueous suspension contains a sulfite level in excess of 20 ppm,
   b. adding an effective amount of a cationic resin to the aqueous suspension of cellulosic fibers,
   c. forming the cellulosic fibers into a sheet, and
   d. drying the sheet to produce a paper,
   wherein the improvement to strength is provided by the cationic resin of step b) and
   wherein the cationic resin of step b) comprises a single component copolymer produced from acrylamide, diallyldimethylammonium chloride, and glyoxal wherein the diallyldimethylammonium chloride comprises greater than 25 mole % of the copolymer before reaction with dialdehyde.

2. The process of making paper of claim 1 wherein the aqueous suspension contains a sulphite level up to about 700 ppm.

3. The process of making paper of claim 2 wherein the aqueous suspension contains a sulfite level in a range of greater than above 20 ppm to about 250 ppm.

4. The process of making paper of claim 3 wherein the aqueous suspension contains a sulfite level in the range from about 50 ppm to about 200 ppm.

5. The process of making paper of claim 1 wherein the reactive cationic resin has a charge density of greater than 1.0 meq/g.

6. The process of making paper of claim 1 wherein the diallyldimethylammonium chloride comprises greater than 25 mole % of the copolymer before reaction with dialdehyde.

7. The process of making paper of claim 1 wherein the diallyldimethylammonium chloride comprises greater than or equal to 30 mole % of the copolymer before reaction with dialdehyde.

* * * * *